(12) United States Patent
Blumrich

(10) Patent No.: US 6,493,800 B1
(45) Date of Patent: Dec. 10, 2002

(54) METHOD AND SYSTEM FOR DYNAMICALLY PARTITIONING A SHARED CACHE

(75) Inventor: Matthias Augustin Blumrich, Mohegan Lake, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/281,934

(22) Filed: Mar. 31, 1999

(51) Int. Cl.[7] ............................................. G06F 12/00
(52) U.S. Cl. ..................... 711/129; 711/130; 711/170
(58) Field of Search ................................. 711/129, 130, 711/131, 121, 171, 172, 100, 118

(56) References Cited

U.S. PATENT DOCUMENTS

| | | | | | |
|---|---|---|---|---|---|
| 4,905,141 A | * | 2/1990 | Brenza | ..................... | 711/129 |
| 5,357,623 A | * | 10/1994 | Megory-Cohen | ........... | 711/129 |
| 5,394,531 A | * | 2/1995 | Smith | ..................... | 711/136 |
| 5,442,747 A | * | 8/1995 | Chan et al. | .................. | 711/129 |
| 5,490,261 A | * | 2/1996 | Bean et al. | .................. | 711/121 |
| 5,509,135 A | * | 4/1996 | Steely, Jr. | .................... | 711/147 |
| 5,537,635 A | * | 7/1996 | Douglas | ..................... | 711/129 |
| 5,584,017 A | * | 12/1996 | Pierce et al. | ................. | 711/146 |
| 5,627,995 A | * | 5/1997 | Miller et al. | ................. | 711/171 |
| 5,875,464 A | * | 2/1999 | Kirk | ..................... | 711/129 |
| 5,924,117 A | * | 7/1999 | Luick | ..................... | 711/127 |
| 5,940,858 A | * | 8/1999 | Green | ..................... | 711/128 |
| 5,946,710 A | * | 8/1999 | Bauman et al. | ............. | 711/129 |
| 6,026,475 A | * | 2/2000 | Woodman | .................... | 711/202 |
| 6,047,356 A | * | 4/2000 | Anderson et al. | ........... | 711/129 |
| 6,112,280 A | * | 8/2000 | Shah et al. | .................. | 711/129 |
| 6,275,901 B1 | * | 8/2001 | Zager et al. | ................. | 711/128 |
| 6,295,580 B1 | * | 9/2001 | Sturges et al. | .............. | 711/129 |
| 6,370,619 B1 | * | 4/2002 | Ho et al. | ..................... | 711/129 |

* cited by examiner

Primary Examiner—Tuan V. Thai
(74) Attorney, Agent, or Firm—Gail H. Zarick, Esq.; McGinn & Gibb, PLLC (57) ABSTRACT

A cache memory shared among a plurality of separate, disjoint entities each having a disjoint address space, includes a cache segregator for dynamically segregating a storage space allocated to each entity of the entities such that no interference occurs with respective ones of the entities. A multiprocessor system including the cache memory, a method and a signal bearing medium for storing a program embodying the method also are provided.

35 Claims, 5 Drawing Sheets

METHOD AND SYSTEM FOR DYNAMICALLY PARTITIONING A SHARED CACHE

BACKGROUND OF THE INVENTION

1. Field of the Invention

The present invention generally relates to caching in a storage hierarchy, and more particularly to a method and system for dynamic allocation of disjoint storage spaces in a shared cache.

2. Description of the Related Art

Caches are used within storage hierarchies to reduce access latencies. Each level of a storage hierarchy has a size and a performance penalty associated with accessing it. Typically, levels with more storage have a higher performance penalty. For example, the traditional memory storage hierarchy of a computer (excluding caches) consists of a small number of processor registers, solid state memory, magnetic disks, and magnetic tapes.

Caches can be inserted into a storage hierarchy to improve performance by taking advantage of locality of reference. A cache has a lower performance penalty than the storage layers below it, and it stores the most recently referenced items from the hierarchy below.

Figure 1:
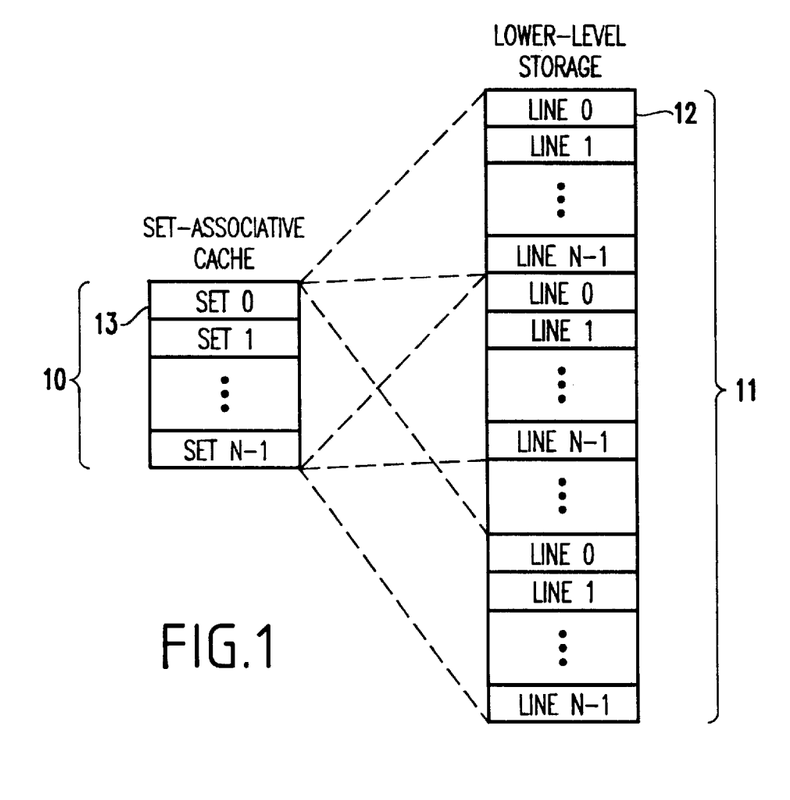
FIG. 1 shows how a direct-mapped (set-associative) cache maps to storage.

FIG. 1 shows how a set-associative cache 10 maps repeatedly onto a large store 11 lower in the storage hierarchy. The large store 11 is divided into fixed-size lines 12. As is known, the "lines" 12 are the smallest unit stored into the cache. Each cache set stores a small, finite number of lines from the large store at any given time, and each line has a fixed set 13 within which it can be stored in the cache. It is noted that a direct-mapped cache is simply a one-way (i.e., one line per set) set-associative cache.

Figure 2:
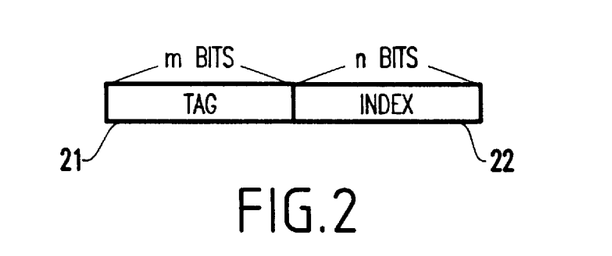
FIG. 2 shows the two portions of an address used to reference a conventional direct-mapped or set-associative cache.

FIG. 2 shows how an address is interpreted by a conventional set-associative cache that contains $2^n$ sets organized as a linear array. An address request has a tag 21 and an index 22.

The "index" 22 indicates which set 13 (e.g., as shown in FIG. 1) will field the cache reference, and the "tag" 21 is used to determine whether the addressed line is stored within one of the lines of the cache set. This address breakdown causes the $2^n$ cache sets (e.g., where "n" is an integer) to map repeatedly onto $2^{n+m}$ lines of storage lower in the storage hierarchy.

Because caches are often comprised of a small amount of fast storage, they are often expensive and it can be advantageous to share them. For example, disk caches and file caches are typically shared by multiple clients.

Shared-memory multiprocessors consist of a plurality of processors sharing a single memory hierarchy. As part of the memory hierarchy, each processor typically has one or more levels of cache that are not shared with the other processors. Additionally, it can be advantageous to insert a shared cache into the memory hierarchy between the processor caches and the main memory. A large shared cache is especially advantageous for alleviating access penalties in non-uniform memory access (NUMA) systems. For purposes of this application, NUMA systems are defined as scalable multi-processors with distributed memory, where each processor's memory access latency varies depending upon where the accessed memory is located within the system.

Sometimes it is necessary to partition a shared-memory multiprocessors so that the single system behaves as if it were multiple, independent, and isolated systems. Each partition consists of a subset of the processors and a disjoint portion of the main memory. It is noted that for purposes of the present application, "disjoint" is defined as separate address spaces having no overlap therebetween.

Because the processor partitions operate independently, they can generate the same addresses that actually refer to different memory locations. This is problematic for a shared cache when the actual partitioning of main memory occurs below the level of the cache. That is, since processor partitions use the same addresses to refer to different memory locations, destructive collisions (e.g., logical interference) can occur in the shared cache.

To avoid such collisions, the shared cache can be partitioned. However, a mechanism is required for uniquely identifying items cached by each of the processor partitions sharing the cache. The cache must prevent items from one partition from overwriting those of another, and it must return the correct items from each partition when it is read. Hitherto the invention, the conventional systems have not provided such a mechanism.

The performance of caches is critical to the overall performance of a storage hierarchy because a cache that is effectively capturing references to the hierarchy below it is accessed often. Thus, there is a need for a cache partitioning mechanism that adds little or no latency to cache accesses. Once again, hitherto the invention such a mechanism has not been provided.

Because the memory needs of multiprocessor partitions vary depending on their workload, the amount of cache space they need also varies dynamically. Therefore, a mechanism is needed for creating cache partitions of unequal sizes. Such has not been possible in the conventional systems and methods.

Furthermore, sometimes it is necessary to guarantee a processor partition some amount of cache storage space to achieve a desired level of system performance. Therefore, a mechanism may be needed to specify the amount of cache space allocated to a partition. When requirements change, it can be desirable to re-partition the shared cache. Hitherto the invention, the conventional systems have not provided a mechanism for dynamically adjusting the number of cache partitions or the amount of space allocated to each partition.

In general, each processor partition should be able to utilize some portion of the shared cache in order to obtain the benefits of caching. Thus, there may be a need for a mechanism that maintains fairness of cache space usage between partitions. Once again, the conventional systems have not provided such a structure and method.

Thus, in the conventional multiprocessor system using a shared-cache memory, partitioning the multiprocessor system with the processors having separate address spaces, a problem occurs in caching the same address to different address spaces. That is, the shared cache is unable to distinguish between multiple address spaces.

Hitherto the invention, neither have such problems been recognized by those of ordinary skill in the art nor have such mechanisms been provided for solving such problems.

SUMMARY OF THE INVENTION

In view of the foregoing and other problems of the conventional methods and structures, an object of the present invention is to provide a method and structure for dynamically partitioning a shared-cache.

Another object of the present invention is to provide a system for partitioning the storage of a shared cache into disjoint portions when cache sharing is not desirable.

In a first aspect of the present invention, a cache memory is provided which is shared among a plurality of separate, disjoint entities having disjoint address spaces. The cache memory includes a segregator for dynamically segregating the storage space allocated to each entity of the entities, based on a contents of an access request, such that no interference occurs with respective ones of the entities.

In a first embodiment of the above-mentioned first aspect of the present invention, the tags of a conventional set-associative cache are extended to include a "partition identifier" (PID) that is unique for each partition within the cache. Whenever the cache is accessed, a PID is provided and included as part of the tag, both for the purpose of tag storage and tag comparison.

The PID tag extension does not guarantee fairness of cache storage space to the partitions, nor does it allow a partition to reserve a portion of the cache for its own use. Rather, partitions compete for storage, and the portion of the cache occupied by any given partition varies dynamically. Therefore, there is no need for a mechanism to allocate cache space to partitions.

This cache partitioning mechanism has several advantages. First, the competition for cache lines between partitions is expected to result in a steady state where each partition has a portion of the cache proportional to its access frequency, and hence, need. This mechanism adjusts dynamically to the cache resource needs of the partitions.

Second, this cache partitioning mechanism has a negligible impact on cache performance because the only significant addition to the conventional cache implementation is a minor extension in the width of the tag comparators.

Since the individual bit comparisons are performed in parallel, the only increase in comparison latency could occur as the results of the bit comparisons are gathered. Since this is commonly implemented using wired-OR logic, any latency increase would be caused by the minor increase in the capacitive load of the wired-OR connection caused by the additional bit comparators. This is likely to be negligible compared with the overall cache access latency.

Third, this cache partitioning mechanism requires very little hardware to be added to a conventional set-associative cache implementation. The tag store must be expanded to include storage for a PID with each tag, but the PID is expected to be only a small number of bits since the number of partitions is expected to be small. In addition, the cache tag comparators must be extended to include a small number of bit comparators for the PID bits.

A second embodiment of the present invention allows the cache sets to be partitioned into disjoint groups so that each of the groups functions like an independent set-associative cache.

This embodiment provides such a function by manipulating the index portion of the cache access address so that a partition is restricted to use a subset of the cache sets. Whenever the cache is accessed, a partition selector and a partition selector mask are provided and used to fix some of the index bits in order to restrict the addressability of the index. This has the effect of basically dividing the set-associative cache into smaller, independent set-associative caches. Any index bits that are replaced by fixed bits are treated as part of the tag.

The cache partitioning mechanism of the second embodiment has several advantages. First, dividing by cache sets allows each partition to enjoy the full associativity of the cache since partitions do not compete for individual cache lines. Many studies have shown the performance advantages of set associativity.

Second, this cache partitioning mechanism has a negligible impact on cache performance when compared with a conventional set-associative cache implementation. There is a small logic delay required to manipulate a few bits of the cache index, and the width of the tag comparators must be extended to include any bits of the index that are modified. The logic delay is a result of replacing specified index bits with bits from the partition selector, and is accomplished with parallel 1-bit multiplexors that incur at most two gate delays. There are two gate delays because a 1-bit multiplexor can always be constructed by performing a logical OR of two logical AND functions, as known. The extension of the tag comparators is accomplished by the same wired-OR mechanism described above.

Third, this cache partitioning mechanism requires very little hardware to be added to a conventional set-associative cache implementation. The tag store must be expanded to include storage for the displaced index bits with each tag, but only a small number of bits is expected to be displaced since the number of partitions is expected to be small. In addition, the cache tag comparators must be extended to include a small number of bit comparators for the displaced index bits. Finally, a small number of 1-bit multiplexors are required to fix specified index bits.

Fourth, this mechanism guarantees cache storage to every partition because the storage is allocated by the partition selectors and partition selector masks. There is no competition for shared space between partitions. Because the mechanism allows the cache partition sizes to vary, appropriately sized partitions can be allocated to provide fairness of storage to all partitions.

Fifth, this mechanism allows the amount of cache storage allocated to partitions to be varied dynamically because the allocation is entirely determined by the partition selector and partition selector mask provided with each cache access. Therefore, the partitioning can easily be adjusted to meet resource needs.

Finally, this mechanism allows cache partitions to be shared because access to a partition is entirely determined by the partition selector and partition selector mask provided with each access.

The present invention also includes a multiprocessor system incorporating the above-described cache memory of the first or second embodiments, a method of dynamically partitioning the shared-cache memory, and a signal bearing medium storing a program embodying the method according to the present invention.

BRIEF DESCRIPTION OF THE DRAWINGS

The foregoing and other purposes, aspects and advantages will be better understood from the following detailed description of a preferred embodiment of the invention with reference to the drawings, in which.

DETAILED DESCRIPTION OF PREFERRED EMBODIMENTS OF THE INVENTION

Referring now to the drawings, and more particularly to FIGS. 3–7, there are shown preferred embodiments of the method and structures according to the present invention.

The present invention provides a mechanism for partitioning a shared cache. For ease of understanding and consistency, the same reference numerals are used throughout the drawings to designate the same elements common to the invention.

First Embodiment

In a first embodiment of the invention, the cache tags of a conventional set-associative cache are extended to include a partition identifier" (PID) that is unique for each partition. The tag is normally of "m" bits as shown in FIG. 2.

Figure 3:
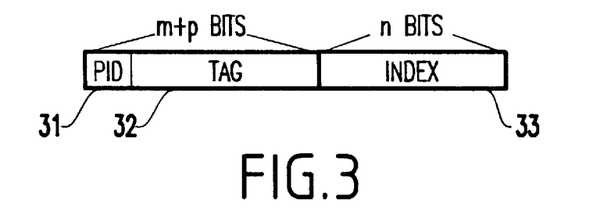
FIG. 3 shows an extension to a cache address of a first embodiment of the present invention.

FIG. 3 illustrates a typical access request including a PID 31, a tag portion 32, and an index portion 33. That is, FIG. 3 shows how the address tag of FIG. 2 is extended to include the PID 31. Whenever the cache is accessed by an entity (e.g., processor) within a particular partition, the PID 31 is provided and included as part of the tag lookup.

Thus, disjoint partitions can use the same addresses to access the cache because their PIDs, and thus all of their cache tags, will differ. Therefore, logical interference is prevented by the present invention. The PID of FIG. 3 supports $2^p$ disjoint partitions with a PID of p bits.

Thus, in the first embodiment, partitioning of the shared cache occurs by changing (e.g., adding to) the tag bits to include the PID. It is noted that the PID 31 in the example of FIG. 3 is added before the tag. However, the PID could be added after the tag and before the index, or even intermingled with the tag bits. It is only important that the PID can be recognized as such by a comparator of the system.

Figure 4:
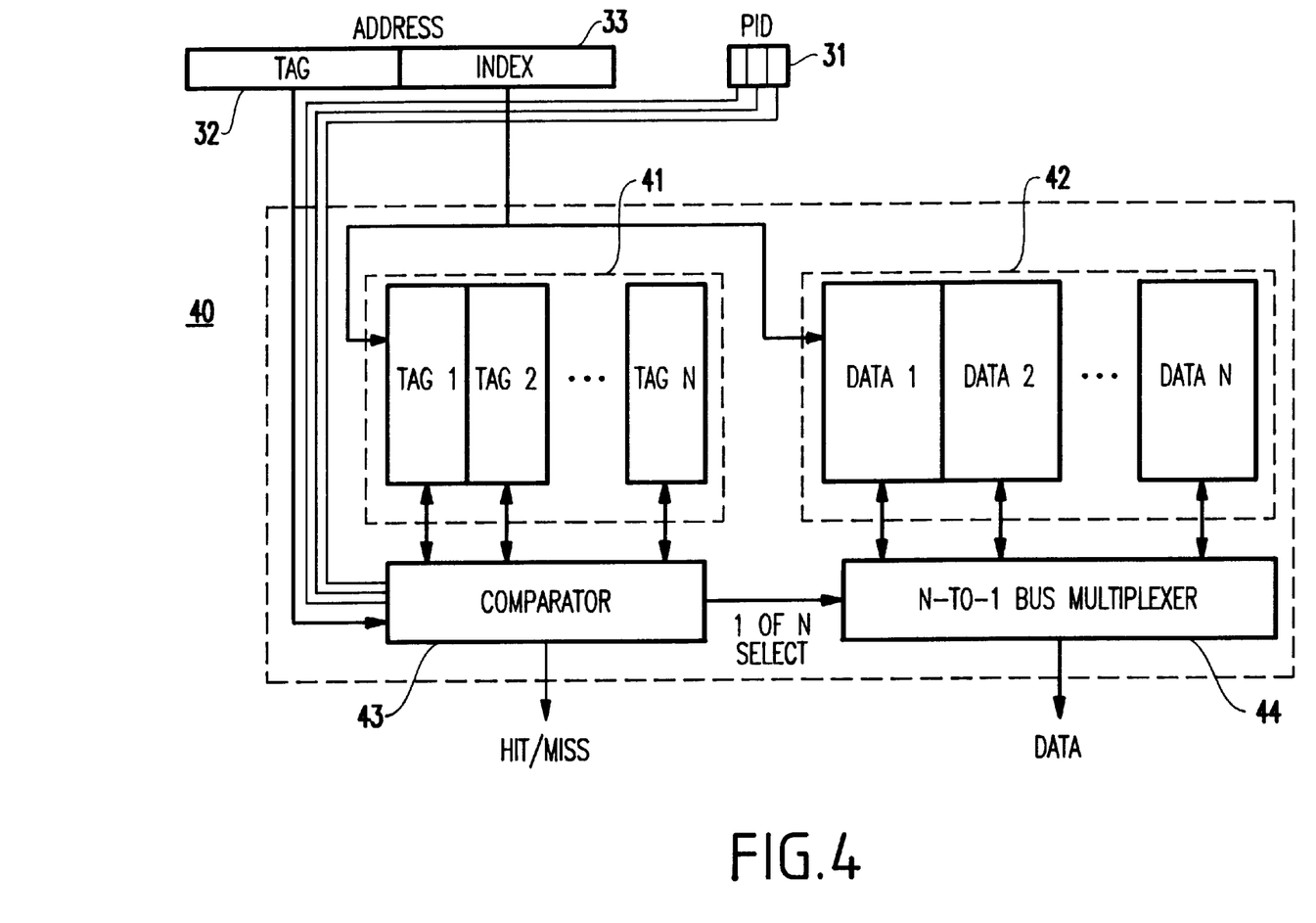
FIG. 4 shows an implementation of the first embodiment of the present invention.

FIG. 4 shows a typical system 40 for implementing the first embodiment of the present invention for an N-way, set-associative cache that can provide up to 8 disjoint partitions. More or less disjoint partitions may be provided by varying the number of bits of the PID (e.g., three bits provides 8 disjoint partitions; that is $2^3$). Thus, the PID is not unique to the processors but to the number of partitions desired. The number of partitions is not dependent on the number of processors.

In the system 40 of FIG. 4, besides the address tag and PID, there is shown "N" tag storage arrays 41 and "N" data storage arrays 42. The tag arrays and data arrays receive the index of the address. A comparator 43 receives an input from the tag arrays, to determine a hit or miss. The comparator 43 also receives the PID 31 and the tag 32. The comparator 43 provides an output (e.g., 1 of N selected) to an N-to-1 bus multiplexer 44. The multiplexer receives an input from the data arrays to provide data to a next processing step. That is, if during a look-up operation a "hit" occurs, the comparator 43 provides an output to the multiplexer 44 which obtains data from the respective data storage array 42, thereby to provide the data.

Each partition has a unique, 3-bit PID associated with it, and the PID 31 is provided along with the address whenever the cache is referenced. It is noted that the PID is not limited to three bits, and thus may have more or less than three bits according to the designer's constraints and requirements. Three bits are used in the present embodiment for ease of understanding only.

Each of the N tag storage arrays 41 is widened by three bits to accommodate the PID 31. When data is stored into the cache, the PID 31 is stored along with the tag. The tag comparator 43 receives the PID along with the tag from the referencing address. The N parallel tag equality comparisons are extended to include a comparison between the PIDs 31 stored with the tags 41 and the PID 31 provided with the cache reference.

The system of FIG. 4 is relevant to both a look-up operation and a store-in operation. A "hit" during a look-up operation has been briefly described above, and is believed to be well within the grasp of ordinary skill in the art taking the present application as a whole. Thus, for brevity, a detailed explanation of the lookup will not be provided herein.

By the same token, if a "miss" occurs, then a store-in operation is performed. A store-in operation also is well-known. Briefly, a tag comparison is again performed, including the PID. If a "hit" occurs in one of the tag arrays, then the comparator 43 configures the multiplexer 44 such that the data is stored into the corresponding data array, and the tag array is updated with the tag 32 and PID 31.

The first embodiment has several advantages. For example, partitions compete for storage, and the portion of the cache occupied by any given partition varies dynamically. Therefore, there is no need for a mechanism to allocate cache space to partitions.

The competition for cache lines between partitions is expected to result in a steady state occurring, where each partition has a portion of the cache proportional to its access frequency, and hence, need. The technique and cache partitioning system of the first embodiment adjusts dynamically to the cache resource needs of the partitions.

Additionally, the first embodiment has a negligible impact on cache performance because the only significant addition to the conventional cache implementation is a minor extension in the width of the tag comparators.

However, a drawback of the first embodiment of the present invention is that there is no guaranteed "fairness" of cache storage space to the partitions, nor does it allow a partition to reserve a portion of the cache for its own use.

That is, if the tag is extended to include the PID, partitions must compete for storage within shared cache sets. With competition for space, one partition may always "get in" (e.g., be favored) over another partition. Typically, a steady state occurs after some time. However, while this can be an advantage in that the cache storage space used by partitions adjusts dynamically with access frequency and hence, need, it is envisioned that some partitions may not be granted a fair amount of space.

Second Embodiment

The second embodiment was designed to overcome several of the above-mentioned drawbacks of the first embodiment. Quite simply, the second embodiment assigns "guaranteed space" to predetermined ones of the partitions.

Figure 5:
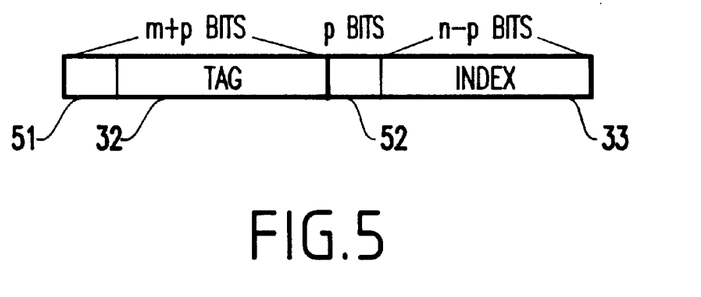
FIG. 5 shows an extension to a cache address in a second embodiment of the present invention.
Figure 6:
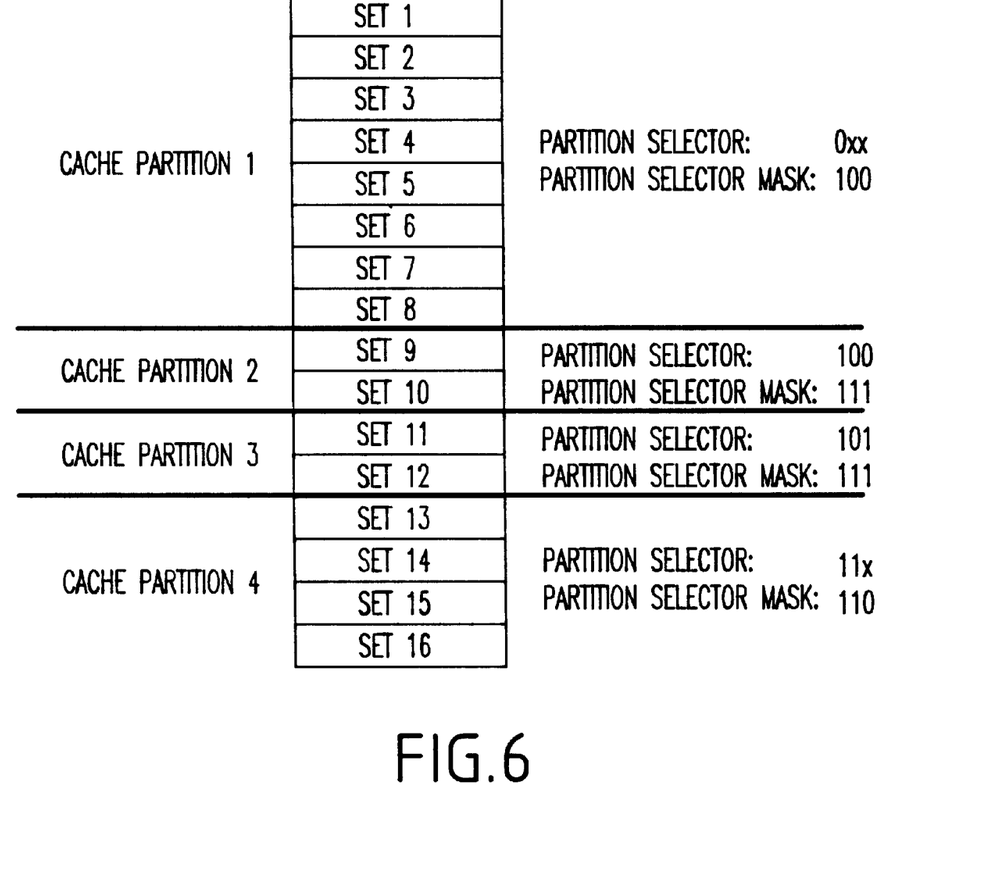
FIG. 6 shows an example of a cache partitioned by the second embodiment of the present invention.
Figure 7:
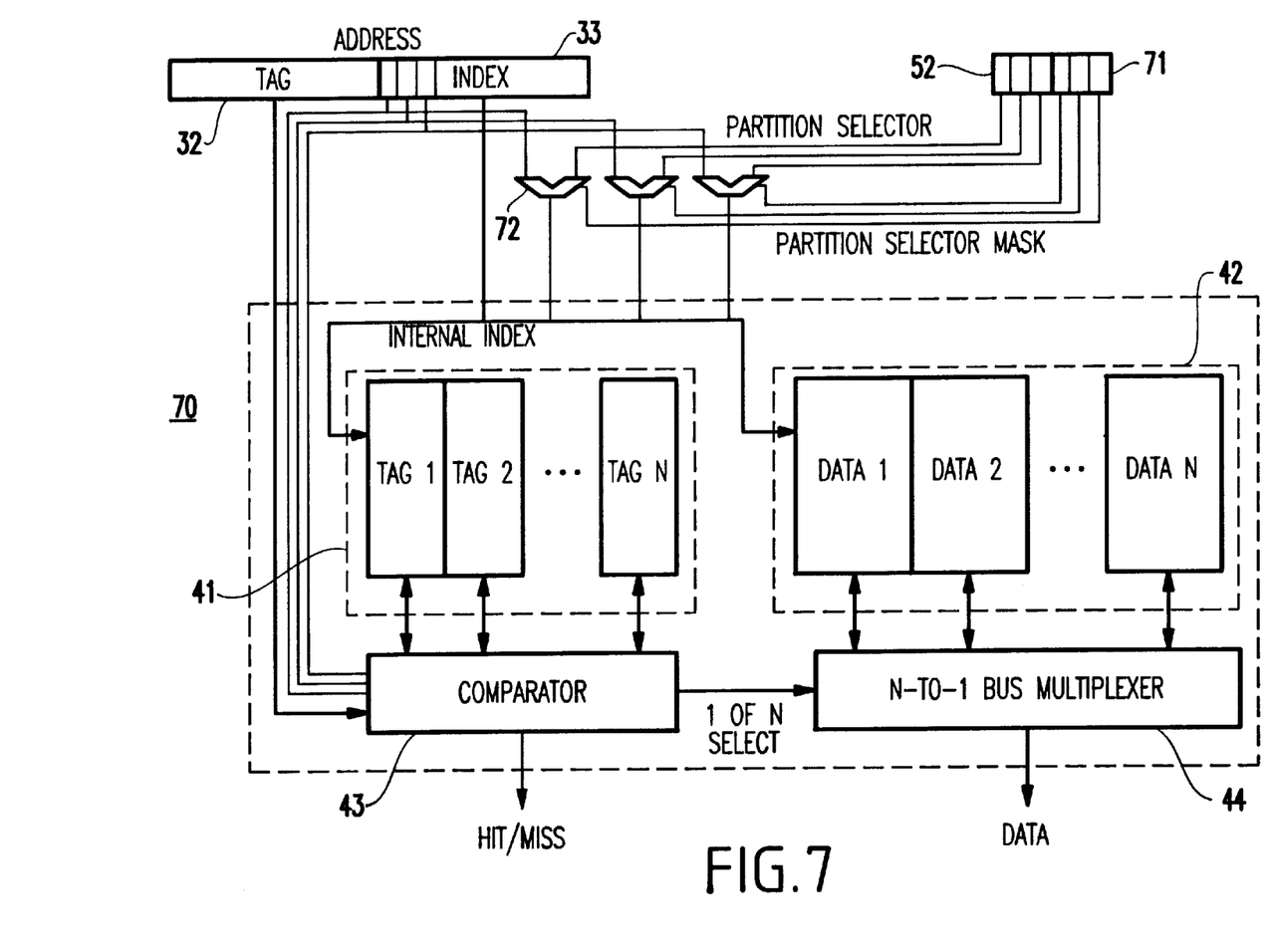
FIG. 7 shows an implementation of the second embodiment of the present invention.

In the second embodiment of the invention, as shown by FIGS. 5–7, the index sets of the cache are partitioned into disjoint groups, or "cache partitions" of various sizes, and each partition is allocated a unique cache partition with a size that meets its needs.

Furthermore, the sizes of the cache partitions can be varied dynamically to adjust to resource needs.

In the second embodiment, cache partitioning is accomplished by forcing (e.g., constraining) some of the index bits in the address presented to the cache to particular values based upon the partition performing the reference. This "constraining" has the effect of restricting the index to a subset of the total sets in the cache.

FIG. 5 illustrates how a cache address is manipulated by the second embodiment to provide cache partitioning.

In FIG. 5, "p" high-order index bits 52 are replaced by a "partition selector", thereby reducing the index 33 to the $2^{n-p}$ cache sets that have the partition selector 52 as their high-order bits.

Because the displaced index bits 51 are significant to the address, they are added to the tag 32, thereby extending it by "p" bits. It is noted that the displaced index bits 51 may be the most significant bits of the index 33, or could be the least significant bits. However, it is irrelevant which bits the displaced bits are so long as all index bits are retained in the address request, either in the index itself or in the displaced bits portion.

In this embodiment, the number of index bits replaced by the partition selector 52 may vary for each partition, to allocate cache partitions of varying sizes and adjust to resource needs. The maximum number of index bits replaced is determined by the minimum cache partition size, because replacing "p" bits results in a cache partition size of $2^{n-p}$ sets.

The maximum number of index bits replaced also determines the maximum number of cache partitions, because always replacing all "p" bits results in $2^p$ disjoint partitions. The minimum number of index bits replaced is zero, which results in a single cache partition consisting of the entire cache (because the address is not modified).

Additionally, the second embodiment includes a "partition selector mask", as shown in FIGS. 6–7. That is, in the second embodiment, the partition selector 52 is accompanied by a partition selector mask (e.g., 71 in FIG. 7) that specifies which bits of the index should be replaced by bits from the partition selector 52. This has the effect of dynamically specifying a size for each cache partition by specifying the number of index bits to replace. With the second embodiment, with every access, a partition selector and a partition selection mask are provided.

The partition selector mask has the same number of bits as the partition selector, and its bits correspond to bit positions of the cache index beginning with the high-order bit. When a mask bit is set, the corresponding index bit is replaced by the partition selector bit having the same bit position as the set mask bit.

FIG. 6 illustrates an example of a set-associative cache with 16 index sets partitioned into four cache partitions (e.g., 1–4) using the mechanism of the second embodiment.

To access partition 1, only the high-order index bit is replaced, as shown in FIG. 6. To access partitions 2 and 3, all three of the high-order index bits are replaced. Finally, to access partition 4, the two high-order index bits are replaced. In FIG. 6, the minimum cache partition size is two sets. Further, it is noted that "x" represents a "don't care" bit.

Thus, in FIG. 6, index bit(s) are replaced by partition selector bit(s). By performing such a function, the index is constrained to a portion of the cache. Thus, using binary (digital) arithmetic, the selector determines how to divide the cache. Taking cache partition 2 as an example and the partition selector bits of "100", this notation would divide the cache between the eight and ninth sets. Further, with the partition selector mask bits of "111", the next division (e.g., between cache partition 2 and cache partition 3) would be between the $10^{th}$ and $11^{th}$ sets. The partition selector mask bits control single-bit multiplexers described below.

FIG. 7 shows a typical implementation of the second embodiment for an N-way, set-associative cache 70 that can provide up to 8 disjoint partitions. It is noted that the partitioning information (e.g., formed of the partition selector and partition selector mask) is dependent on the number of partitions. The number of partitions is $2^k$, where k is an integer representing the number of partition selector and partition selector mask bits.

Every time an address is presented to the cache 70, the partition selector 52 and partition selector mask 71 are also presented. Each of the bits of the partition selector mask 71 controls a 1-bit multiplexor 72 that selects either an index bit or a partition selector bit to become part of the internal index.

Therefore, up to a predetermined number (e.g., three in FIG. 7) index bits from the address can be replaced by partition selector bits to form the internal index. The internal index is used to reference the tag and data arrays in the same manner as a conventional set-associative cache.

Each of the N tag storage arrays of this embodiment is widened by three bits to accommodate the replaceable index bits (i.e., the index bits of the reference address that are subject to replacement by partition selector bits) so that they are not lost if they are replaced. When data is stored into the cache, the three replaceable index bits are stored along with the tag. The tag comparator 43 of this embodiment always receives the three replaceable index bits along with the tag from the referencing address. The N parallel tag equality comparisons are extended to include a comparison between the replaceable index bits stored with the tags and the replaceable index bits of the referencing address in the same manner as the PID bits of the first embodiment.

The present invention described above can be applied to all shared, set-associative caches including, but not exclusive to, memory caches, disk caches, and file caches.

Figure 8:
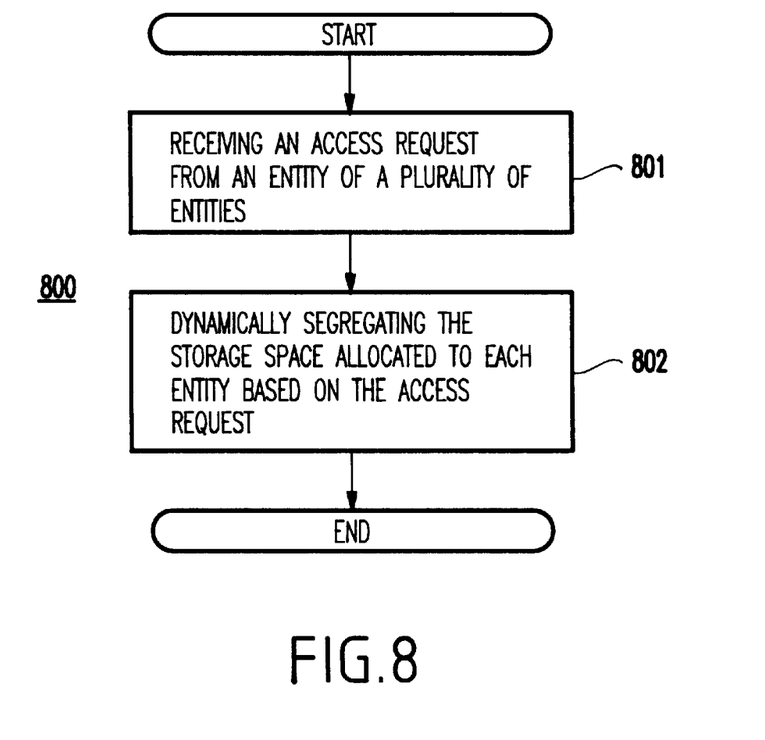
FIG. 8 illustrates a flowchart of the inventive method 800 for implementing either of the first or second embodiments according to the present invention.

In its most basic form, the method 800 of the invention implementing one of the above embodiments, is shown in the flowchart of FIG. 8. Specifically, the inventive method 800 of partitioning a cache memory shared among a plurality of separate, disjoint entities each having a disjoint address space, includes receiving an access request from one of the entities (step 801). Thereafter, in step 802, the storage space allocated to each entity of the entities, is dynamically segregated based on the access request, such that no interference occurs with respective ones of the entities. Such dynamic segregation occurs through implementing one of the first and second embodiments above.

Figure 9:
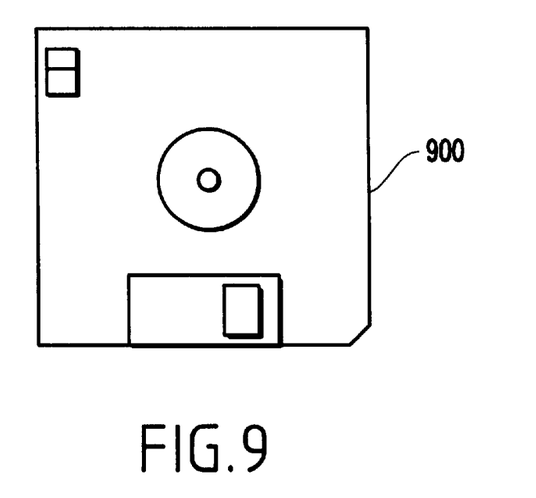
FIG. 9 illustrates a storage medium 900 for storing a program embodying the method 800 for dynamically partitioning a shared-cache.

As shown in FIG. 9, in addition to the hardware and process environment described above, a different aspect of the invention includes a computer-implemented method for dynamically partitioning a shared-cache, as described above. As an example, this method may be implemented in the particular environment discussed above.

Such a method may be implemented, for example, by operating a central processing unit (CPU), to execute a sequence of machine-readable instructions. These instructions may reside in various types of signal-bearing media.

Thus, this aspect of the present invention is directed to a programmed product, comprising signal-bearing media tangibly embodying a program of machine-readable instructions executable by a digital data processor incorporating the CPU and hardware above, to perform a method of dynamically partitioning a shared-cache.

This signal-bearing media may include, for example, a RAM (not shown) contained within the CPU, as represented by the fast-access storage for example. Alternatively, the instructions may be contained in another signal-bearing media, such as a magnetic data storage diskette 900 (FIG. 9), directly or indirectly accessible by the CPU.

Whether contained in the diskette 900, the CPU, or elsewhere, the instructions may be stored on a variety of machine-readable data storage media, such as DASD storage (e.g., a conventional "hard drive" or a RAID array), magnetic tape, electronic read-only memory (e.g., ROM, EPROM, or EEPROM), an optical storage device (e.g. CD-ROM, WORM, DVD, digital optical tape, etc.), paper "punch" cards, or other suitable signal-bearing media including transmission media such as digital and analog and communication links and wireless. In an illustrative embodiment of the invention, the machine-readable instructions may comprise software object code, compiled from a language such as "C", etc.

Now that the invention has been described by way of preferred embodiments, various modifications and improvements will occur to those ordinarily skilled in the art.

For instance, shared caches for items other than computer memory stores such as magnetic disk block caches or file system file caches could benefit from partitioning. Thus, it should be understood that the preferred embodiments are provided as an example and not as a limitation. The scope of the invention is defined by the appended claims.

What is claimed is:

1. A cache memory shared among a plurality of separate, disjoint entities, said cache memory comprising:
   means for receiving an access request from one of said entities; and
   means for dynamically and physically segregating a storage space allocated to each entity of said entities, based on said access request, such that no interference occurs with respective ones of said entities,
   wherein said segregating means comprises means for extending a cache tag of an access request to include a unique identifier for identifying individual ones of said entities.

2. The cache memory according to claim 1, wherein said entity comprises at least one processor.

3. The cache memory according to claim 1, wherein the cache comprises a set-associative cache.

4. The cache memory according to claim 1, wherein said unique identifier comprises a partition identifier (PID) included with said access request.

5. The cache memory according to claim 4, wherein said PID is different from others of said PID and is provided such that whenever the cache is accessed by an entity, the PID is included as part of a tag lookup, such that disjoint entities can use a same address to access the cache.

6. The cache memory according to claim 4, wherein varying a number of bits of said PID varies a number of segregated cache partitions, said number of partitions being independent of a number of entities.

7. The cache memory according to claim 4, wherein said PID is unique for each partition of said cache segregated by said segregating means.

8. The cache memory according to claim 1, wherein said cache memory comprises one of a disk cache memory and a file cache memory.

9. The cache memory according to claim 1, wherein said cache memory comprises a single cache memory shared among said plurality of entities, such that said cache memory is partitioned such that independent groups of said entities, each of which physically share the cache memory, are allocated independent cache partitions.

10. The cache memory according to claim 9, wherein each of the groups accesses its portion of the cache memory using a same set of physical addresses.

11. The cache memory according to claim 1, wherein said segregating means supports multiple, dynamically-selectable partition sizes, such that said cache memory selectively includes variable-sized partitions to satisfy caching requirements of the entity partitions.

12. The cache memory according to claim 1, wherein said cache segregator dynamically re-segregates the cache memory when a machine configuration changes or a sharing of cache partitions changes.

13. The cache memory according to claim 1, wherein a segregated entity selectively includes multiple address spaces.

14. A cache memory shared among a plurality of separate, disjoint entities, said cache memory comprising:
   means for receiving an access request from one of said entities; and
   means for dynamically and physically segregating a storage space allocated to each entity of said entities, based on said access request, such that no interference occurs with respective ones of said entities,
   wherein said segregating means includes means for constraining, based on a unique identifier, a cache index of an access request to fall within a particular set of index sets.

15. The cache memory according to claim 14, wherein said constraining means assigns a guaranteed set of index sets to predetermined ones of said entities.

16. The cache memory according to claim 14, wherein the index sets of the cache are partitioned into disjoint groups of various sizes,
   said disjoint groups being cache partitions, each cache partition being allocated a unique portion of the cache with a size meeting its requirements.

17. The cache memory according to claim 14, wherein sizes of the cache partitions can be varied dynamically to adjust to resource needs.

18. The cache memory according to claim 14, wherein said constraining means performs cache partitioning by forcing a predetermined number of index bits in an access request to particular values based upon the entity performing a reference, such that the index is constrained to a subset of the total sets in the cache.

19. The cache memory according to claim 14, further comprising:
   a partition selector for performing said partitioning by replacing "p" high-order bits of an "n"-bit index, thereby reducing the index to the $2^{n-p}$ cache sets that have the partition selector as their high-order bits, wherein "p" is a non-negative integer.

20. The cache memory according to claim 19, wherein said replaced index bits are displaced, said displaced index bits being added to the tag, thereby extending said tag by "p" bits.

21. The cache memory according to claim 19, wherein a number of index bits replaced by the partition selector varies for each partition, to allocate cache partitions of varying sizes.

22. The cache memory according to claim 19, wherein said constraining means further comprises a partition selector mask which accompanies a partition selector in an access request,
   said partition selector mask specifying which bits of the index are to be replaced by bits from the partition selector, thereby dynamically specifying a size for each cache partition by specifying the number of index bits to replace.

23. The cache memory according to claim 22, wherein said partition selector mask has a same number of bits as the partition selector, and its bits correspond to bit positions of the cache index beginning with the high-order bits, and wherein when a mask bit is set, the corresponding index bit is replaced by a partition selector bit having a same bit position as a set mask bit.

24. The cache memory according to claim 14, wherein a minimal access time required of the cache memory is maintained while providing segregating by index sets.

25. A multiprocessor system having a plurality of separate, disjoint entities each having a disjoint address space, said multiprocessor system comprising:

a cache memory shared among said plurality of separate, disjoint entities, said cache memory including:
an access request portion for receiving an access request from any of said plurality of entities and providing a unique identifier for identifying individual ones of said entities,
wherein said unique identifier dynamically and physically segregates the storage space allocated to each entity of said entities, based on said access request, such that no interference occurs with respective ones of said entities,
wherein said unique identifier extends a cache tag of an access request to include a unique identifier for identifying individual ones of said entities.

26. A multiprocessor system having a plurality of separate, disjoint entities each having a disjoint address space, said multiprocessor system comprising:

a cache memory shared among said plurality of separate, disjoint entities, said cache memory including:
an access request portion for receiving an access request from any of said plurality of entities and providing a unique identifier for identifying individual ones of said entities,
wherein said unique identifier dynamically and physically segregates the storage space allocated to each entity of said entities, based on said access request, such that no interference occurs with respective ones of said entities,
wherein said cache memory includes a plurality of tag storage arrays and a plurality of data storage arrays, and said tag storage arrays and data storage arrays receive the index of the access request, said system further comprising:
a comparator, coupled to said tag storage arrays, for receiving said unique identifier and a tag of said access request; and
a multiplexer, coupled to said comparator and to said data storage arrays, to provide data externally thereto based on an output from said comparator.

27. The multiprocessor system according to claim 26, wherein said unique identifier comprises a partition identifier (PID) for identifying a partition of said cache memory, and said PID is provided with said access request when said cache memory is referenced by an entity.

28. The multiprocessor system according to claim 26, wherein each of the tag storage arrays is widened by a predetermined number of bits to accommodate the unique identifier, and wherein when data is stored into the cache, the unique identifier is stored along with the tag.

29. A multiprocessor system having a plurality of separate, disjoint entities, said multiprocessor system comprising:

a cache memory shared among said plurality of separate, disjoint entities, said cache memory including:
an access request portion for receiving an access request from any of said plurality of entities and a unique identifier, said unique identifier constraining a cache index of said access request to fall within a particular set of index sets from one of said entities,
wherein a storage space allocated to each entity of said entities is based on said access request including said unique identifier, such that no interference occurs with respective ones of said entities.

30. The multiprocessor system of claim 29, wherein said cache memory includes tag storage arrays and data storage arrays, and said tag storage arrays and data storage arrays receive the cache index of the access request, and wherein said unique identifier comprises a partition selector, said system further comprising:

a comparator, coupled to said tag storage arrays, for receiving said partition selector and a tag of said access request;
a plurality of multiplexers, coupled to receive respective bits of said partition selector, and providing an input to said tag storage arrays and to said data storage arrays; and
a multiplexer, coupled to said comparator and to said data storage arrays, to provide data externally thereto based on an output from said comparator.

31. A method of partitioning a cache memory shared among a plurality of separate, disjoint entities each having a disjoint address space, said method comprising:

receiving an access request from one of said entities; and
dynamically and physically segregating the storage space allocated to each entity of said entities, based on said access request, such that no interference occurs with respective ones of said entities,
wherein said segregating comprises extending a cache tag of an access request to include a unique identifier for identifying individual ones of said entities.

32. A signal-bearing medium tangibly embodying a program of machine-readable instructions executable by a processing apparatus to perform a method of dynamically partitioning a cache memory shared among a plurality of separate, disjoint entities each having a disjoint address space, said method comprising:

receiving an access request from one of said entities; and
dynamically and physically segregating the storage space allocated to each entity of said entities, based on said access request, such that no interference occurs with respective ones of said entities,
wherein said segregating comprises extending a cache tag of an access request to include a unique identifier for identifying individual ones of said entities.

33. A cache memory shared among a plurality of separate, disjoint entities, said cache memory comprising:

a storage space; and
a cache segregator for dynamically and physically segregating said storage space based on access requests received from said entities, such that no interference occurs with respective ones of said entities,
wherein said segregator includes a constraining unit for constraining, based on a unique identifier, a cache index of an access request to fall within a particular set of index sets.

34. A method of partitioning a cache memory shared among a plurality of separate, disjoint entities each having a disjoint address space, said method comprising:

receiving an access request from one of said entities; and dynamically and physically segregating the storage space allocated to each entity of said entities, based on said access request, such that no interference occurs with respective ones of said entities, wherein said dynamically segregating includes constraining, based on a unique identifier, a cache index of an access request to fall within a particular set of index sets.

35. A signal-bearing medium tangibly embodying a program of machine-readable instructions executable by a processing apparatus to perform a method of dynamically partitioning a cache memory shared among a plurality of separate, disjoint entities each having a disjoint address space, said method comprising:

receiving an access request from one of said entities; and dynamically and physically segregating the storage space allocated to each entity of said entities, based on said access request, such that no interference occurs with respective ones of said entities, wherein said dynamically segregating includes constraining, based on a unique identifier, a cache index of an access request to fall within a particular set of index sets.

* * * * *